UNITED STATES PATENT OFFICE.

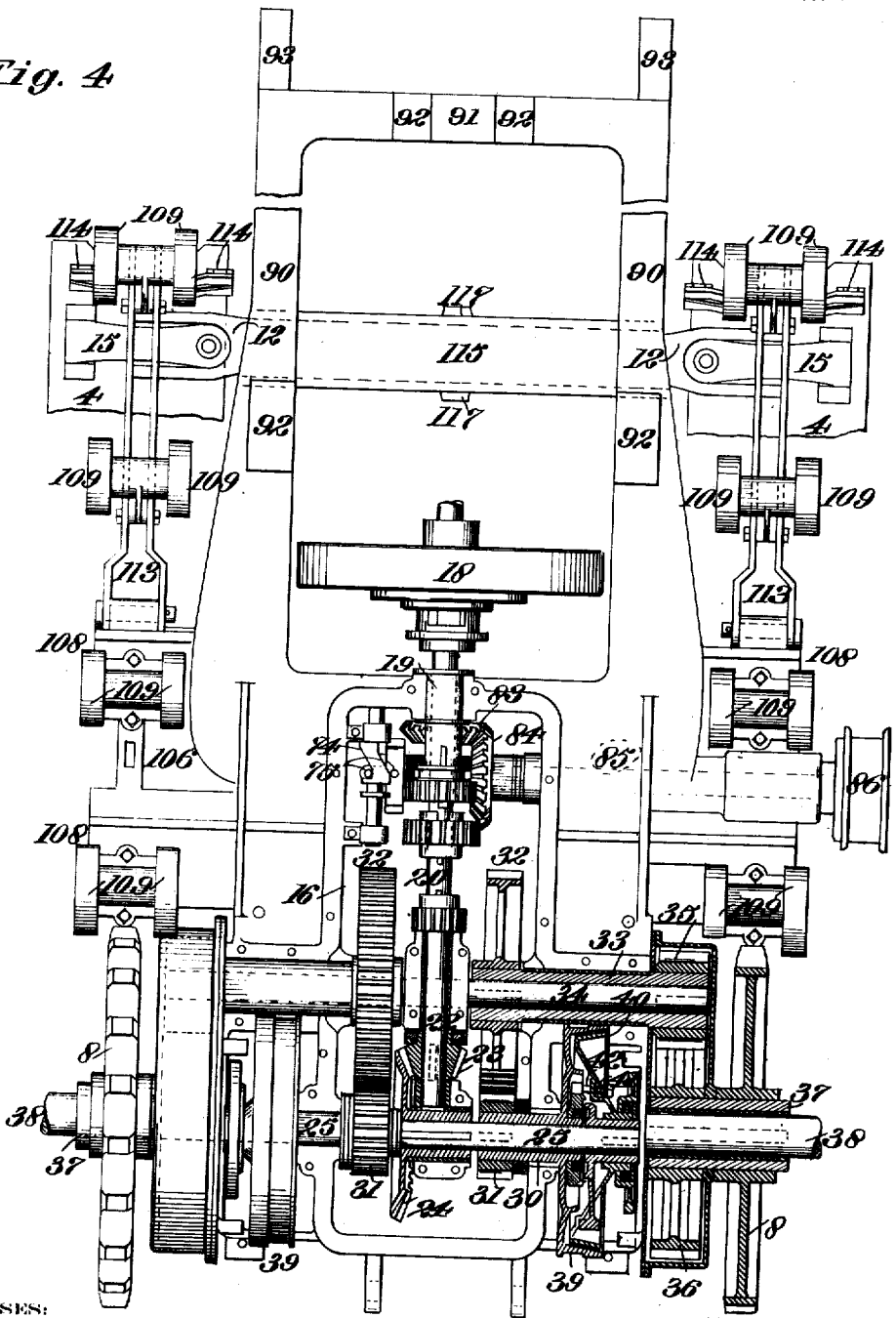

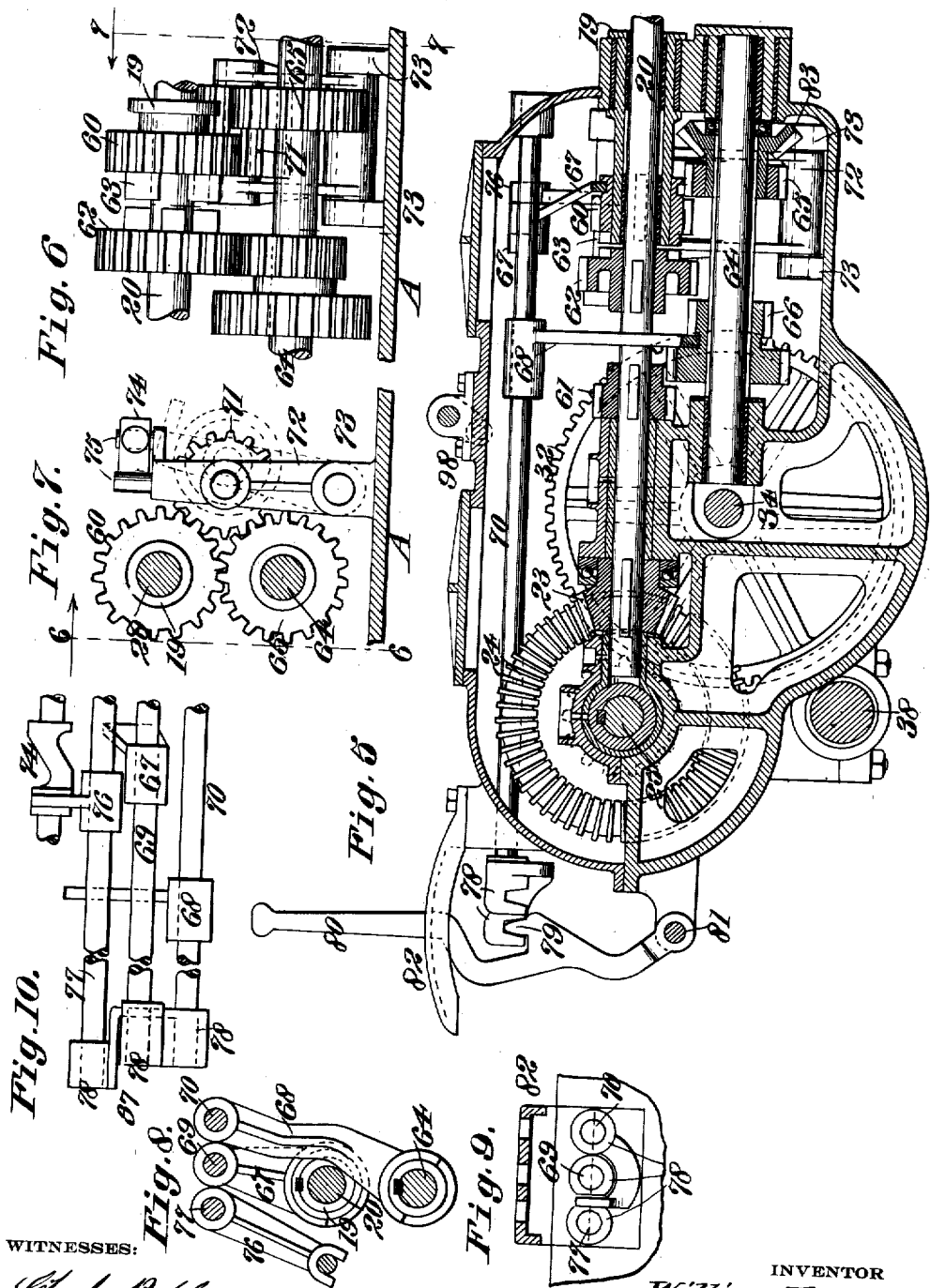

WILLIAM TURNBULL, OF PEORIA, ILLINOIS, ASSIGNOR TO THE HOLT MANUFACTURING COMPANY, OF STOCKTON, CALIFORNIA, A CORPORATION OF CALIFORNIA.

TRACTION-ENGINE.

1,344,360.  Specification of Letters Patent.  Patented June 22, 1920.

Application filed February 10, 1916. Serial No. 77,382.

*To all whom it may concern:*

Be it known that I, WILLIAM TURNBULL, a citizen of the United States, residing at Peoria, in the county of Peoria and State of Illinois, have invented a new and useful Improvement in Traction-Engines, of which the following is a specification.

This invention relates to traction engines of the type in which the whole of the weight of the vehicle is supported upon a pair of endless tracks and the vehicle is steered by varying the relative speed of such tracks.

The object of the invention is to simplify and improve the construction and operation of such a device.

In carrying out this object, I employ a main frame carried upon the endless tracks through the medium of roller-fitted trucks; the trucks on each side being articulated and pivoted upon a transverse pivot shaft to form a flexible member. The frame is supported at the rear upon the truck members by means of two sets of springs, one at each side, and is carried at its front upon a transverse yoke or equalizing beam which is pivoted centrally to the said frame and at its extremities to the forward sections of the trucks by means of universal joints.

The drive for the tracks and belt pulley is by means of selective gear transmission, controlled by a single hand lever guided in a slotted plate, somewhat after the manner of automobile practice, to vary the speed of the tractor to reverse the direction of the same and to operate the belt pulley.

The drive to the tracks is through friction steering clutches interposed in the normal driving means for each track. These steering clutches are controlled by a single device which may take the form of a tiller-lever, hand-wheel, pedal gear or the like, and this controlling device is so combined with or coupled to suitable brake connections for the driven members of the steering friction clutches, that these brakes may be applied by a further or subsequent movement of the said controlling device. In this way either steering clutch may be slipped or disengaged by appropriate actuation of the control device and by a subsequent or further movement of such controlling device the brake may be applied to the previously driven member of that clutch. Similarly on reversing the movement or movements of the controlling device the brake will be released before the clutch is engaged.

One form which my invention may assume is exemplified in the following description and illustrated in the accompanying drawings, in which—

Fig. 4 shows a plan view, partly in section, of the frame and driving mechanism.

Fig. 5 shows a central, longitudinal, sectional view of the transmission and associated parts.

Fig. 6 shows a detached side elevation of the shiftable gears of the transmission.

Fig. 7 shows an end elevation of the same, looking in the direction of the arrows 7—7 of Fig. 6.

Fig. 8 shows a detached sectional view of the gear-shifting mechanism.

Fig. 9 shows a vertical, sectional view of the guide plate for the gear-shifting lever, illustrating the shift rods therefor in end elevation.

Fig. 10 shows a detail, plan view of the gear-shifting mechanism.

Figure 1:
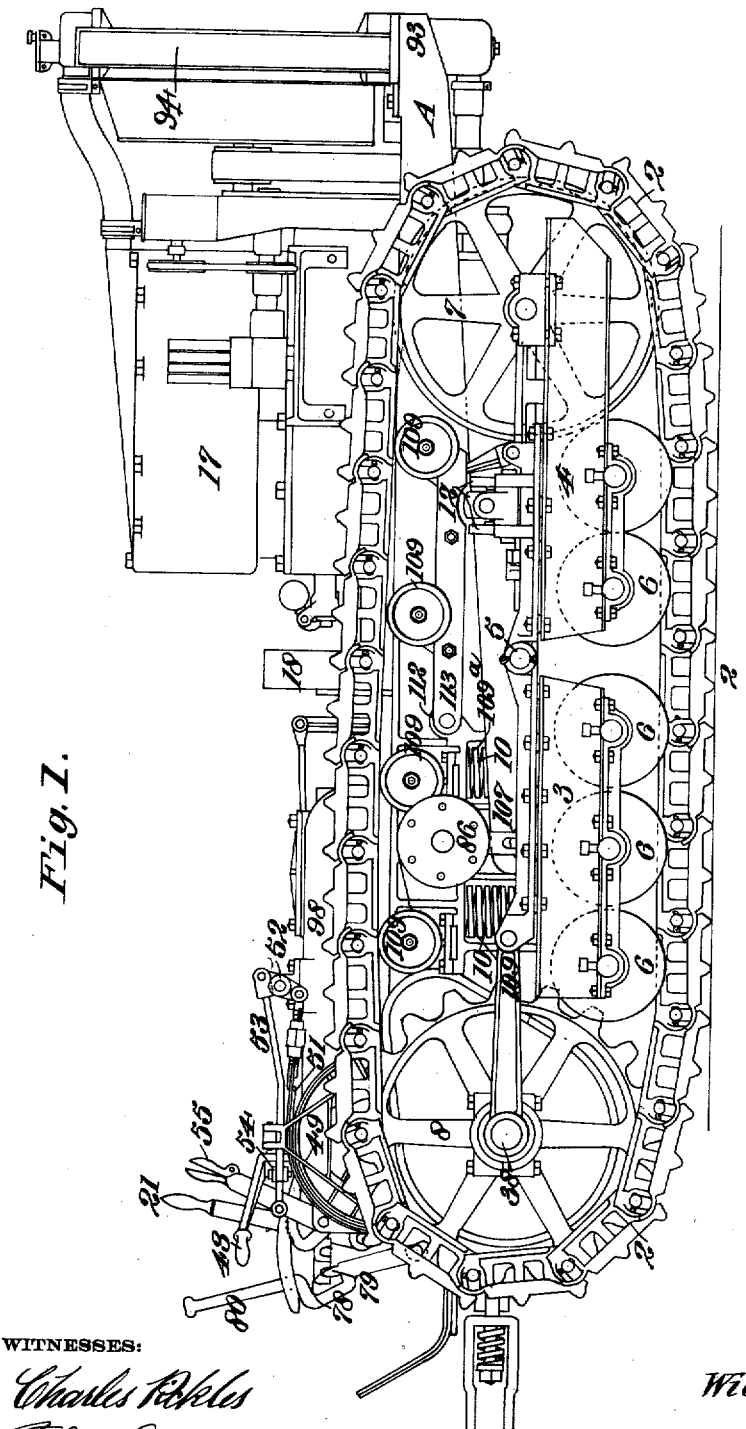
Figure 1 shows a side elevation of a device embodying my invention.

A represents the frame or chassis of the vehicle, supported by means hereinafter to be described on a pair of endless, flexible, self-laying track belts or members 2. Within each track member is a truck frame comprising respective front and rear sections 4—3, pivoted together at their adjacent end, as at 5, and having wheels or rollers 6 adapted to run on the track formed on the inner side of the track member. The forward end of a forward section 4 supports an idle sprocket 7 around which the traction member passes back to the drive sprocket 8 suitably journaled on the frame A.

The rear end of the frame A is directly supported on the rear truck sections 3 by springs 10, there preferably being two sets of springs for each rear truck section, as shown. The front end of the frame is supported on the forward truck sections 4 through the medium of an equalizing bar 12 which is pivoted centrally to and beneath frame A at 13; the ends of bar 12 being pivoted to pivot blocks 14, which in turn are pivoted gimbal-ring fashion to brackets 15 on the truck frames, so that a universal joint connection is formed between each truck section 4 and the respective end of the equalizing bar 12.

This form of mounting constitutes as near as possible a three point suspension for the main frame and adds materially to the flexibility of the traction members. Even on rough or uneven ground the strains on the front truck section are taken up at the center of the frame and not at one side thereof.

Further advantages of this type of suspension are that it reduces the strain and twist on the frame to a minimum; permits the tracks to conform to the ground closely at all times, thereby holding a good footing; and reduces vibration on the machine due to the fact that the tracks in riding over rough ground do not pivot on the high points but ride over them conforming to such points in place of climbing and rocking over them.

The transmission and steering mechanism for the tractor is carried as a unit in a casing 16 on the main frame and is especially designed for this type of tractor, whereby, from a single operating lever or hand-wheel, the steering of the tractor may be controlled.

Power to operate the traction belts is derived from a suitable motor 17, mounted on the main frame, operating through a clutch 18 connectible with a sleeve 19 on a drive-shaft 20, said clutch being controlled by a hand-lever 21 at the rear of the tractor. Novel gear shift mechanism 22 forms a connection between said sleeve and shaft, and bevel gears 23 and 24 connect the drive-shaft with a transverse jack-shaft 25.

On each end of the shaft 25 is loosely mounted a sleeve 30, carrying a pinion 31 meshing with a corresponding large spur gear 32 on a counter-driving sleeve 33 carried on a transverse axle 34 and having fixed to it a pinion 35, meshing with a spur gear 36 fixed to a sleeve 37 which connects with the driving sprocket wheel 8 upon the trunnion 38. The driving and steering of the vehicle is effected by the interposition of a suitable clutch mechanism between the sleeve 30 and the shaft 25.

As here shown, each sleeve 30 is provided with one member 39 of a friction clutch. The other member 40 of the friction clutch is secured to rotate with shaft 25, but has a limited sliding movement thereon so as to be moved into and out of engagement with its complementary member 39. There are two of these sleeves 30 and friction clutches with corresponding driving pinions, one set on one side of the gear 24 and the other set to the opposite side of said gear. The clutch members 39—40 are normally in driving engagement, being held thereto by springs 41 mounted on studs 42; the studs being anchored in the clutch member 39 and the springs exerting an inward pressure on the complementary clutch member 40. Preferably these clutch members are cone-shaped.

With the clutches normally in, power to propel the machine is transmitted equally to each of the rear sprockets 8 and to the tracks so that the machine is driven straight ahead. By manipulating the clutches so that one may be out while the other is in, or allowing one to slip more or less while the other stays in, the steering of the machine is readily accomplished. Preferably the connections for both clutches are arranged and constructed so that a single lever member, as 43, serves to operate either clutch at will.

As here shown, the steering lever 43 is fulcrumed at 44 and carries a crank member 45, having two segmental slots 46 to accommodate corresponding pins 47 on respective links 48, said links 48 being connected to levers 49, each fulcrumed at 50 on one side of the machine in juxtaposition to one of the clutches. The levers 49 are each adapted to move a respective friction clutch member 40 lengthwise of shaft 25 for the purpose of engaging or disengaging one or the other of the clutches.

Brake mechanism is provided for the clutch member 39 in the form of a friction band 51 for each, which bands are operated by a separate rocking member 52 actuated by links 53 connected to an equalizing bar 54. Bar 54 is carried on a hand-lever 55 by means of a plate 56. Each link 53 has a lug 57 formed thereon in position to be engaged by a tooth 58 on the slotted crank 45. When the latter is moved to set the clutch mechanism at either side a continued movement of the slotted crank will engage a tooth 58 with one of the lugs 57 and act to set the brake mechanism on the clutch member which has been disconnected.

In operation, it will be seen from the foregoing that by turning the steering lever 43 to the right (Fig. 2) only the link 48 to the left will be moved, and as a consequence only the clutch on the left-hand side of the machine will be disengaged or allowed to slip; the clutch on the right-hand side of the machine remaining undisturbed and in full driving connection, so that in proportion to the release of power delivered to the left-hand traction member the machine will turn more or less to the left. To steer to the right, the operation of the steering lever 43 is reversed so as to throw out the clutch on the right, leaving the clutch on the left-hand side in driving connection with its track. The turning or steering movement may be accentuated by applying one or the other of the band brakes 51 to the drum on the corresponding clutch member 39, which is done by increasing the movement of the lever 43. The band brakes 42 may also be operated by the hand-lever independently of the steering lever to set them simultaneously.

The advantage of a construction of this nature is that it enables a machine to be handled without the interposition of a differential gear, and provides for a quick turning of the machine in either direction through the operation of a single lever.

The gear set 22, which connects the drive-shaft 20 with the driving sleeve 19, comprises, as best shown in Fig. 5, a driving pinion 60 slidable on the sleeve 19 and keyed thereto. Pinions 61 and 62 are fixed to the drive-shaft 20, the one adjacent to the driving pinion 60 being provided with a clutch face 63 to be engaged by a coöperating clutch face on the slidable pinion. One of the gears 62 is of comparatively large diameter while the other gear 61 is preferably one-half as large in diameter. Beneath the drive-shaft 20 is a countershaft 64 carrying a fixed pinion 65 and a slidable stepped pinion 66 both keyed to said shaft. The fixed pinion 65 is adjacent to the slidable driving pinion 60 and is adapted to be intermeshed therewith, while the stepped pinion is located in a plane between the fixed pinions 61 and 62 above and is adapted to mesh alternately therewith. The slidable pinions 60 and 66 are provided with shift arms 67 and 68 respectively, running to respective push-rods 69 and 70.

Figure 2:
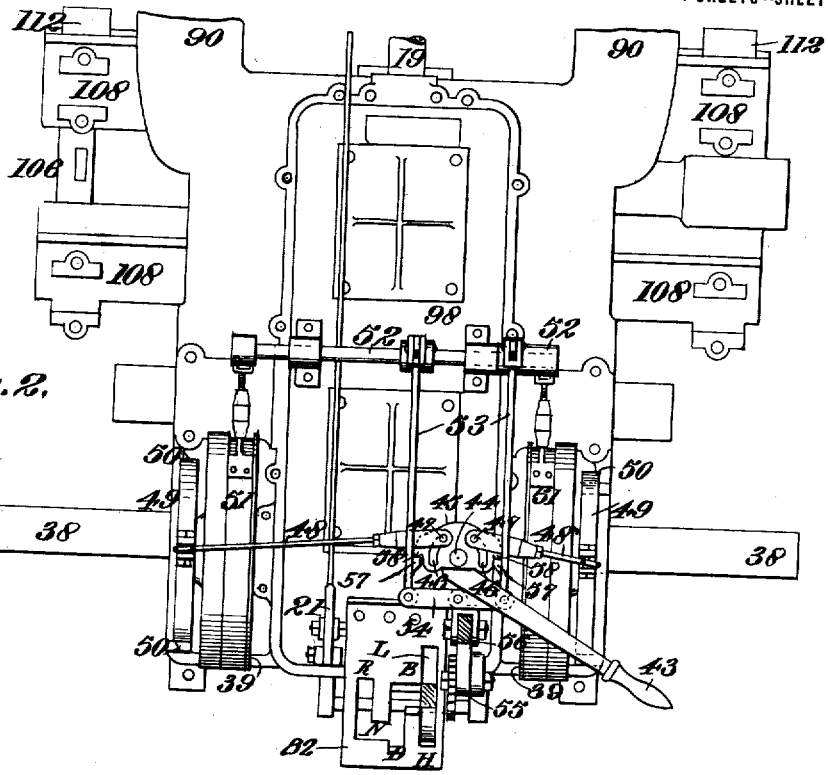
Fig. 2 shows a fragmentary plan view of the same.
Figure 3:
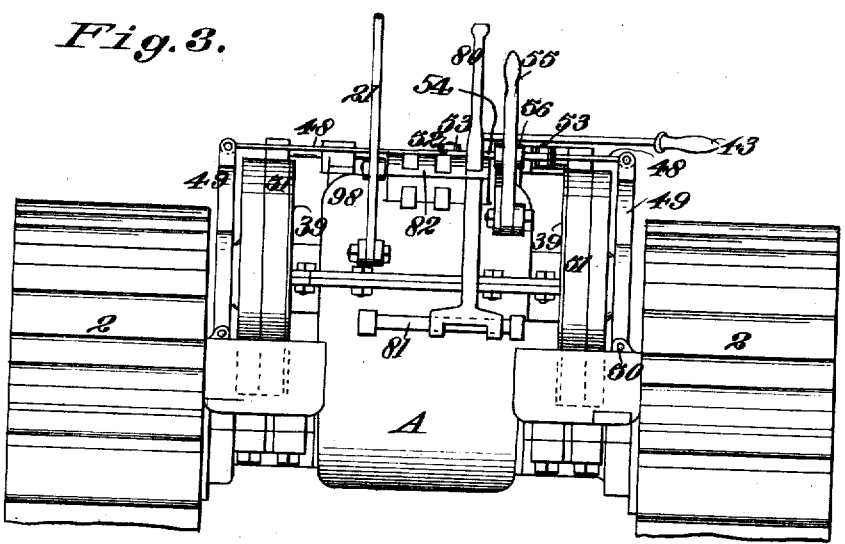
Fig. 3 shows a fragmentary rear elevation.

At one side of the shafts 20 and 64 is a reversing pinion 71 (best shown in Figs. 6 and 7) mounted upon a yoke 72, pivoted at its lower end to lugs 73 carried on the bottom of the transmission casing. The said gear 71 is in position to mesh with both of the gears 60 and 65, whereby to transmit motion from the former to the latter for the purpose of reversing the direction of movement of the shaft 64. An inclined cam 74 working between pins 75 carried on the transmission casing is fixed to the yoke 72 and has an arm 76 connecting it with a push-rod 77, the latter being arranged parallel to and in a plane with the push rods 69 and 70. On the rear end of each of said push-rods is a tooth 78, each of which is adapted to be engaged by a lug 79 on a shifting lever 80, the latter being laterally movable upon a fulcrum rod 81. The said lever 80 is guided into position for engaging its lug with each of the teeth 78 in a selective manner by means of a slotted plate 82, shaped as shown in Fig. 2, where the positions are as follows: N represents the neutral position where no engagement occurs between the lever and the push-rods and no angular movement of the said lever is permitted; D represents direct speed of the tractor and in such position the lever is engaged with the tooth on the rod 69, with said rod retracted where the driving pinion 60 is clutched with the fixed pinion 62, thereby permitting a direct speed from the driving sleeve 19 to the drive-shaft 20. When the lever is at B (which indicates the operation of the belt pulley) the push-rod 69 is moved forwardly to cause a meshing of the driving pinion 60 with the fixed pinion 65 and connected with said pinion 65 is a beveled pinion 83, meshing with a beveled pinion 84 carried upon a transverse shaft 85 projecting to one side of the frame and having fixed upon its outer end a belt pulley 86 for furnishing power for stationary purposes.

When the lever is moved to the position H the driving pinion 60 is allowed to remain in mesh with the pinion 65 and the tooth on the push rod 70 is engaged and said rod moved rearwardly where the stepped pinion 66 will engage the small pinion 61 and thereby drive the shaft 20 at an increased speed. L indicating the low speed is at the opposite end of the same slot in the plate and the lever 80 in such position causes a forward shifting of the stepped pinion 66 to mesh it with the large pinion 62, thus transmitting a slower speed to the drive-shaft 20.

To reverse the direction of rotation of the drive-shaft 20 the lever 80 is moved to the opposite side of the plate 82, thereby placing the pinions 60 and 66 in neutral position, thence engaging the tooth on the rod 77 to move the same forwardly, and through the action of the inclined cam 74 cause a rocking of the yoke 72 which will engage the pinion 71 carried thereby with the pinions 60 and 65.

Rod 70 has an arm 87, as shown in Fig. 10, which projects to a point adjacent to the rod 77 where it is adapted to be engaged by the tooth on the lever 80 when the latter is in position for reversing the gearing. Thereby the rod 70 will be moved forwardly coincident with the rod 77, causing an engagement of the stepped pinion 66 with the large pinion 62 and the consequent transmission of movement from the reversely driven countershaft 64 to the drive-shaft 20 at slow speed.

This arrangement gives a simple and easy control of the transmission gearing and allows the use of three speeds for driving the tractor, a reverse driving of the same, and a separate belt pulley drive all from a single controlling lever.

Having thus described my invention, what I claim and desire to secure by Letters Patent is—

1. In a traction engine or similar vehicle having its entire weight supported upon a pair of self-laying tracks, the combination of a motor, driving means between the motor and tracks, steering means in the driving connections including a pair of friction clutches, one of each pair of said clutches being laterally shiftable and said clutches being normally in for the purpose of driving the machine straight ahead, means for slipping the shiftable clutch members to steer the machine, a band brake operative in conjunction with each non-shiftable clutch member to supplement the steering operation, and unitary means for operating both clutches and brakes in a manner to disconnect each clutch mechanism separately and subsequently apply the corresponding brake.

2. In a traction engine, the combination of a main frame mounted upon a pair of flexible, self-laying tracks, driving means for the tracks and friction cone clutches in the driving means, one friction clutch for each track, means for maintaining the friction clutches normally in, a single control lever for slipping either clutch independently for the purpose of steering the vehicle, an external contracting band brake in conjunction with each friction clutch, and means for applying the brakes to augment the steering operation, said brake mechanism being operated by continued movement of the clutch controlling lever.

3. In a traction engine with appropriate traction members, drive connections to the traction members, means for steering the vehicle interposed in the drive connections and including a pair of normally-in friction clutches, a steering lever connected with the movable member of each friction clutch, means by which said steering lever may be turned in one direction to release one clutch without affecting the other clutch, and vice versa when turned in the other direction, said connection between said steering lever and the clutches including a slotted crank, links leading from said slotted crank, oscillating levers connected with said links and with the movable members of the friction clutches, a band brake for each clutch, rockshafts for setting said band brakes, an equalizing bar connecting said rock-shafts, a lever carrying said bar, and a connection between the slotted crank and the bar whereby the brakes may be applied by a continued movement of the steering lever.

4. In a tractor, a pair of traction devices, a friction clutch interposed in the driving connections for each traction device, a brake mechanism for each traction device, a single lever for controlling both clutches and brakes whereby to steer the tractor, operative connections between the lever and clutches permitting the clutches to be disengaged alternately, and operative connections between the lever and brake mechanism disposed in the path of the lever and movable thereby to set one of the brakes when the lever has been moved to position to disengage the corresponding clutch.

In testimony whereof I have hereunto set my hand in the presence of two subscribing witnesses.

WILLIAM TURNBULL.

Witnesses:
EMIL F. NORELIUS,
BENJ. S. PFEIFFER.

Certificate of Correction.

It is hereby certified that in Letters Patent No. 1,344,360, granted June 22, 1920, upon the application of William Turnbull, of Peoria, Illinois, for an improvement in "Traction Engines," an error appears in the printed specification requiring correction as follows: Page 4, after line 67 insert the following as claim 5:

*5. In a vehicle having friction steering clutches, a single vertically pivoted steering lever to actuate said clutches, brakes on the driven members of the steering clutches, a rock shaft carrying means to operate said brakes, an equalizing mechanism connecting said last-named means, and means whereby the steering lever may selectively engage parts of said equalizing mechanism to operate one brake or another.;*
and that the said Letters Patent should be read with this correction therein that the same may conform to the record of the case in the Patent Office.

Signed and sealed this 8th day of January, A. D., 1924.

[SEAL.]
KARL FENNING,
*Acting Commissioner of Patents.*